UNITED STATES PATENT OFFICE.

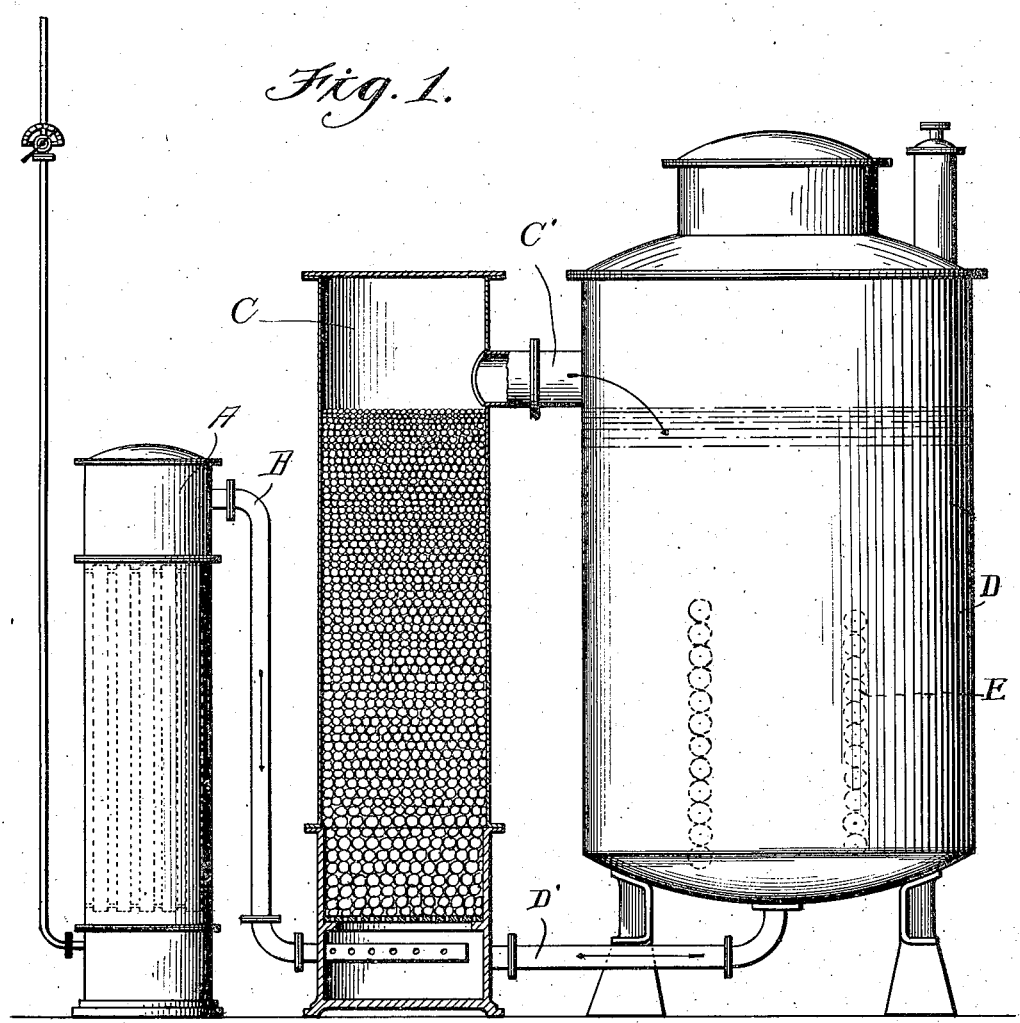

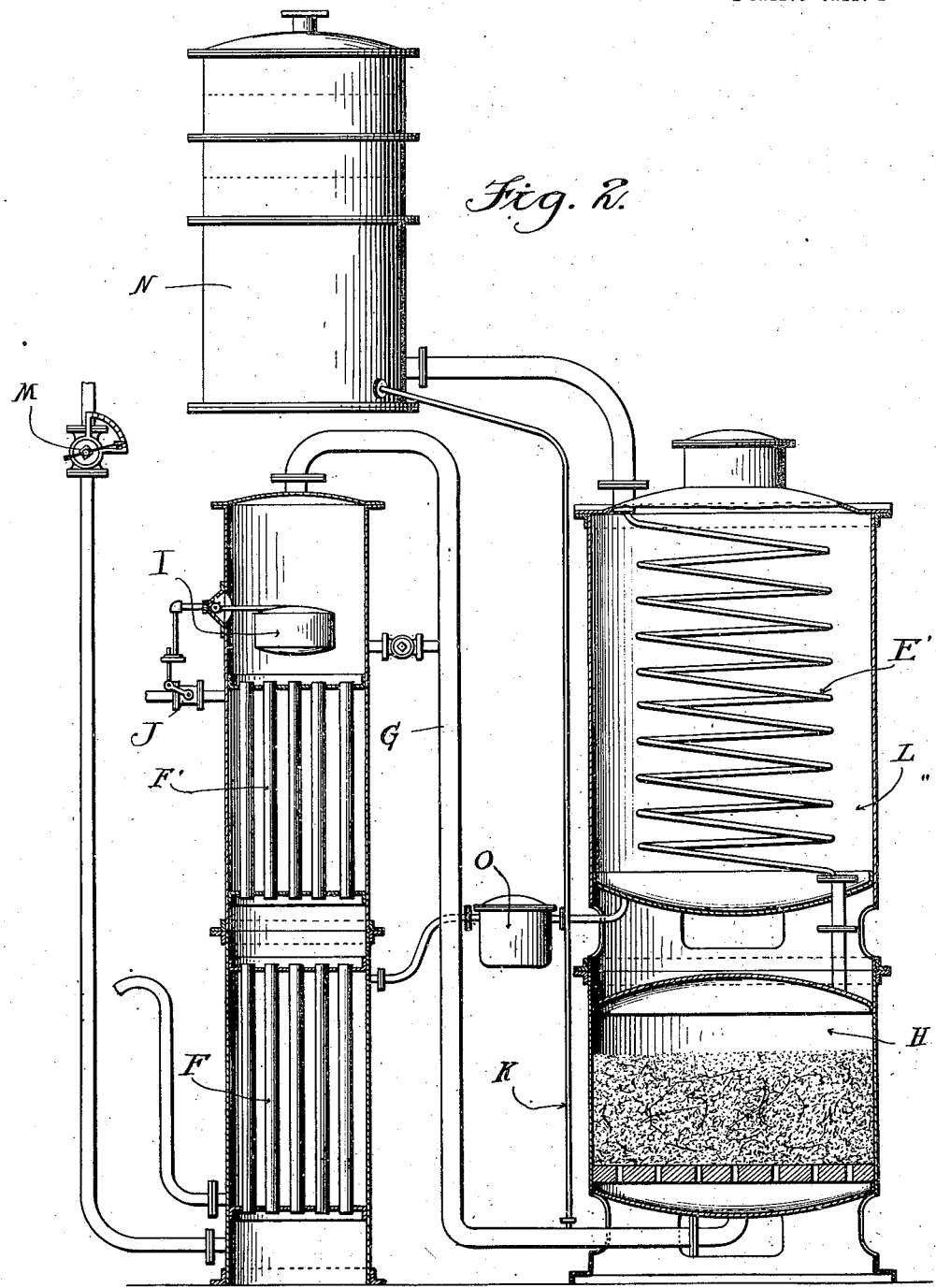

EMILE AUGUSTIN BARBET, OF PARIS, FRANCE, ASSIGNOR TO E. BARBET & FILS & CIE., OF PARIS, FRANCE.

PROCESS FOR THE CONTINUOUS PRODUCTION OF ETHER.

1,328,258.  Specification of Letters Patent.  Patented Jan. 20, 1920.

Application filed May 5, 1916. Serial No. 95,613.

*To all whom it may concern:*

Be it known that I, EMILE AUGUSTIN BARBET, citizen of the French Republic, residing at 5 Rue de l'Echelle, Paris, France, have invented certain new and useful Improvements in Processes for the Continuous Production of Ether, of which the following is a specification.

It is known that the reaction of sulfuric acid upon alcohol that produces sulfuric ether comprises two stages:

In the first stage the alcohol is dissolved in the acid with the formation of ethyl sulfuric acid.

In the second stage the ethyl sulfuric acid is decomposed by heat, whereby and whereupon the ether is actually formed and given off.

This ether, however, is not pure as it contains a certain amount of alcohol which depends upon the greater or less predominance of the acid in the mixture treated.

Hitherto the formation and decomposition of the ethyl sulfuric acid have usually been effected in one and the same boiler or vessel although these two operations are essentially opposed to each other.

It has, however, been proposed to effect the formation of ethyl sulfuric acid, and the decomposition of the said acid in two stages.

The present invention has now for its object to provide an improved process and apparatus for the continuous production of ether. According to the improved process the two operations above referred to are conducted separately although still forming part of one and the same process. By this means each operation can be effected under the conditions which suit each operation best for being effected in the best and most complete manner.

The improved process will now be described with reference to the accompanying drawings which illustrate two forms of improved apparatus for carrying out the said process. In these drawings:

Figure 1 is a diagrammatic sectional elevation of the general arrangement of one embodiment of the improved apparatus for effecting the improved process.

Fig. 2 is a corresponding view of the second embodiment of the apparatus.

The first stage which consists in causing the alcohol to combine with the sulfuric acid is effected according to the present invention in the following manner:

The alcohol passes into a tubular heater A wherein it is converted into vapor. This vapor is led by a pipe B into the bottom of a device C which is lead lined and contains dividing materials such as porcelain balls, lead plates perforated with small holes, or a charge of broken quartz in which device the alcohol and sulfuric acid are brought together.

The bottom of the device C communicates by a pipe D' with the lower part of a boiler D containing acid at a high temperature. The acid from which the ether has been distilled, flows from the lower part of the boiler D, through pipe D' into the lower part of the alcoholizer C.

The acid and the alcohol are thus brought into intimate contact in the device C wherein the dividing materials have merely the function of causing the bubbles of vapor to become subdivided in the acid, and of providing a greater number of contacts for the purpose of increasing as much as possible the combining points of the alcohol with the acid and thus producing hyperalcoholized ethyl sulfuric acid.

The second stage of the process will now take place.

The ethyl sulfuric acid formed in the hyperalcoholizer C enters through a pipe C' into the upper part of the boiler D which is made of metal plate lined with lead. This boiler contains a leaden heating coil E in which steam under pressure circulates. The ethyl sulfuric acid which has already a high temperature on its entry into the boiler, is thereby further heated; de-alcoholization takes place and the ether vapor rises to the top of the boiler whence it is withdrawn for rectification. It will be seen that the flow of liquid in C is upward, and in D is downward, thus insuring completeness of reaction and certainty of flow.

When the ethyl sulfuric acid reaches the bottom of the boiler D, it contains necessarily a predominance of acid, (or a deficiency of alcohol) hence when it passes out through the pipe D' it is in the best condition for recommencing the cyclic process, and for again combining with alcohol in the vessel C.

The sequence of the two stages takes place regularly under the conditions which are best for each of them. The first stage is characterized by the absence of any heating, while in the other stage the heating is the fundamental feature of the operation.

There are many ways of carrying out the duality of the two interdependent operations of forming and then decomposing the ethyl sulfuric acid according to the process hereinbefore described. The construction of apparatus shown in Fig. 1 is given merely by way of example.

Referring now to the second embodiment of an apparatus according to the invention illustrated in Fig. 2:

F F' is a tubular apparatus for heating the alcohol and is hereinafter referred to.

The alcohol after passing through the tubular apparatus enters through the pipe G into the chamber H in which the combination of the alcohol and sulfuric acid takes place after having come into contact with the hyperalcoholized acid which enters the pipe G from the pipe K.

This hyperalcoholizer contains as in the preceding case, dividing materials or perforated plates.

The formation of ethyl sulfuric acid is effected in a complete manner in the chamber H by reason of the intimate mixture of the acid and alcohol, and the acid which is now hyperalcoholized, passes into the coil E' located in the receptacle L'', and the steam under pressure is led into the said receptacle, (which receptacle, and the supports for the coil, consequently need not be made of lead) so that it heats the said ethyl sulfuric acid, to cause the decomposition of the latter, thereby effecting the second stage of the process.

The acid which is saturated with alcohol commences to boil as soon as it enters the coil. Being pushed onward by the bubbles of vapor it rises more and more rapidly in the convolutions of the coil and issues forcibly into the receiver N (which may form the lower member of an ordinary saturator).

The alcohol is fed in through the regulator M, into the bottom of the tubes of the heater F, and thence rises through the open space connecting the two heaters, and through the tubes of the heater F'.

The ether vapors are thus drawn off and then the acid partially freed from ether flows down again through the pipe K for the purpose of being hyperalcoholized afresh, and the cycle of the two stages is repeated continuously as before.

Mitscherlich in studying the processes of the etherification of alcohol, recognized that the phenomenon was identically the same whether the alcohol was injected in the liquid state into the acid or injected in the state of vapor into the acid.

When it is desired to inject the alcohol in the liquid state, (while using such an apparatus as shown in Fig. 2) it is merely necessary to dispense with the tubular vessels F F', in the two forms of apparatus hereinbefore described, and to supply the alcohol in the cold state directly through the pipe G.

In the apparatus shown in Fig. 2, the preheating of the alcohol is effected without cost by recovery of the heat of the water of condensation which is produced in the vessel L'' by means of the automatic discharge device O. If desired, to this hot water there may be added the residual liquors of the rectifier (not shown).

If it is preferred to inject the alcohol in the state of vapor, either the apparatus shown in Fig. 1 (heater A) or the apparatus shown in Fig. 2 (heater F F') may be employed.

The heater F' differs from the heater F in that it is provided with a steam regulator. It is preferred to employ expanded or exhaust steam of 100° to 105° since the alcohol is subject to partial decomposition at high temperatures. The volume of alcohol which is to be introduced is regulated by means of the tap J. The heater F' should be supplied with just the amount of steam which is necessary for producing the vapor. For this purpose the boiling alcohol acts upon a float I which acts in its turn through suitable levers upon the handle of a throttle valve J provided at the inlet of the heating steam. When too much steam enters the level of the alcohol sinks since the vaporization is excessive, whereupon the throttle valve will be partially closed. If on the other hand the level tends to rise through insufficient vaporization, the float will also rise and thus open more the orifice for the admission of heating steam.

It is to be noted that in addition to the advantages hereinbefore stated, the improved process allows of employing always the same acid which is constantly being regenerated with the same degree of hydration, and only a small quantity of acid is used.

What I claim is:

1. The process for the continuous production of ether by the dehydration of alcohol by means of sulfuric acid and in a closed cycle, which comprises bringing together ethyl alcohol and sulfuric acid; maintaining the acid and alcohol in contact until the alcohol is entirely absorbed by the acid and ethyl sulfuric acid is thereby formed; immediately and separately subjecting the ethyl sulfuric acid to the action of heat in order to effect partial decomposition of the ethyl sulfuric acid and to set free ether; bringing the acid incompletely freed from ether into contact with a further quantity of ethyl alcohol, thus completing the cycle, and varying the composition of the reaction mass throughout this cyclic process only by causing the necessary chemical and physical changes to take place in the process and by introducing further quantities of alcohol into the system.

2. The process for the continuous production of ether by the dehydration of alcohol by means of sulfuric acid and in a closed cycle, which comprises bringing together hot ethyl alcohol and sulfuric acid; maintaining the acid and alcohol in contact until the alcohol is entirely absorbed by the acid and ethyl sulfuric acid is thereby formed; immediately and separately subjecting the ethyl sulfuric acid to the action of heat in order to effect partial decomposition of the ethyl sulfuric acid and to set free ether; bringing the acid incompletely freed from ether into contact with a further quantity of hot ethyl alcohol thus completing the cycle, and varying the composition of the reaction mass throughout this cyclic process only by causing the necessary chemical and physical changes to take place in the process and by introducing further quantities of alcohol into the system.

3. The process for the continuous production of ether by the dehydration of alcohol by means of sulfuric acid and in a closed cycle, which comprises bringing together ethyl alcohol in the vapor state and sulfuric acid; maintaining the acid and alcohol in contact until the alcohol is entirely absorbed by the acid and ethyl sulfuric acid is thereby formed; immediately and separately subjecting the ethyl sulfuric acid to the action of heat in order to effect partial decomposition of the ethyl sulfuric acid and to set free ether; bringing the acid incompletely freed from ether into contact with a further quantity of ethyl alcohol in the vapor state, thus completing the cycle, and varying the composition of the reaction mass throughout this cyclic process only by causing the necessary chemical and physical changes to take place in the process and by introducing further quantities of alcohol into the system.

4. Process for the continuous production of ether which consists essentially in separating the production of the ether into two distinct but interdependent stages; in the first stage the alcohol being vaporized, and the vapors mixed intimately with the acid from which ether has been distilled off, in a device adapted to facilitate the formation of ethyl sulfuric acid, and in the second stage, the partial decomposition of the ethyl sulfuric acid being effected by heating to a temperature above that used in the first step, and in a separate receptacle, the partially decomposed ethyl sulfuric acid being returned to the first stage.

5. A cyclic process of making ether, which comprises subjecting sulfuric acid to the action of alcohol at a relatively low temperature, while causing the acid to flow through a mass of obstructions, whereby ethyl sulfuric acid is produced, heating the ethyl sulfuric acid sufficiently to cause the production of ether vapor, and sulfuric acid, separating and leading away the ether vapor, and returning the sulfuric acid to the first stage of the process, and repeating the cycle of operations.

6. A cyclic process of making ether, which comprises subjecting sulfuric acid to the action of vapors of alcohol at a relatively low temperature, while causing the acid to flow through a mass of obstructions, whereby ethyl sulfuric acid is produced, heating the ethyl sulfuric acid sufficiently to cause the production of ether vapor, and sulfuric acid, separating and leading away the ether vapor, and returning the sulfuric acid to the first stage of the process, and repeating the cycle of operations.

In testimony whereof I have signed my name to this specification.

EMILE AUGUSTIN BARBET.